United States Patent Office 2,760,225
Patented Aug. 28, 1956

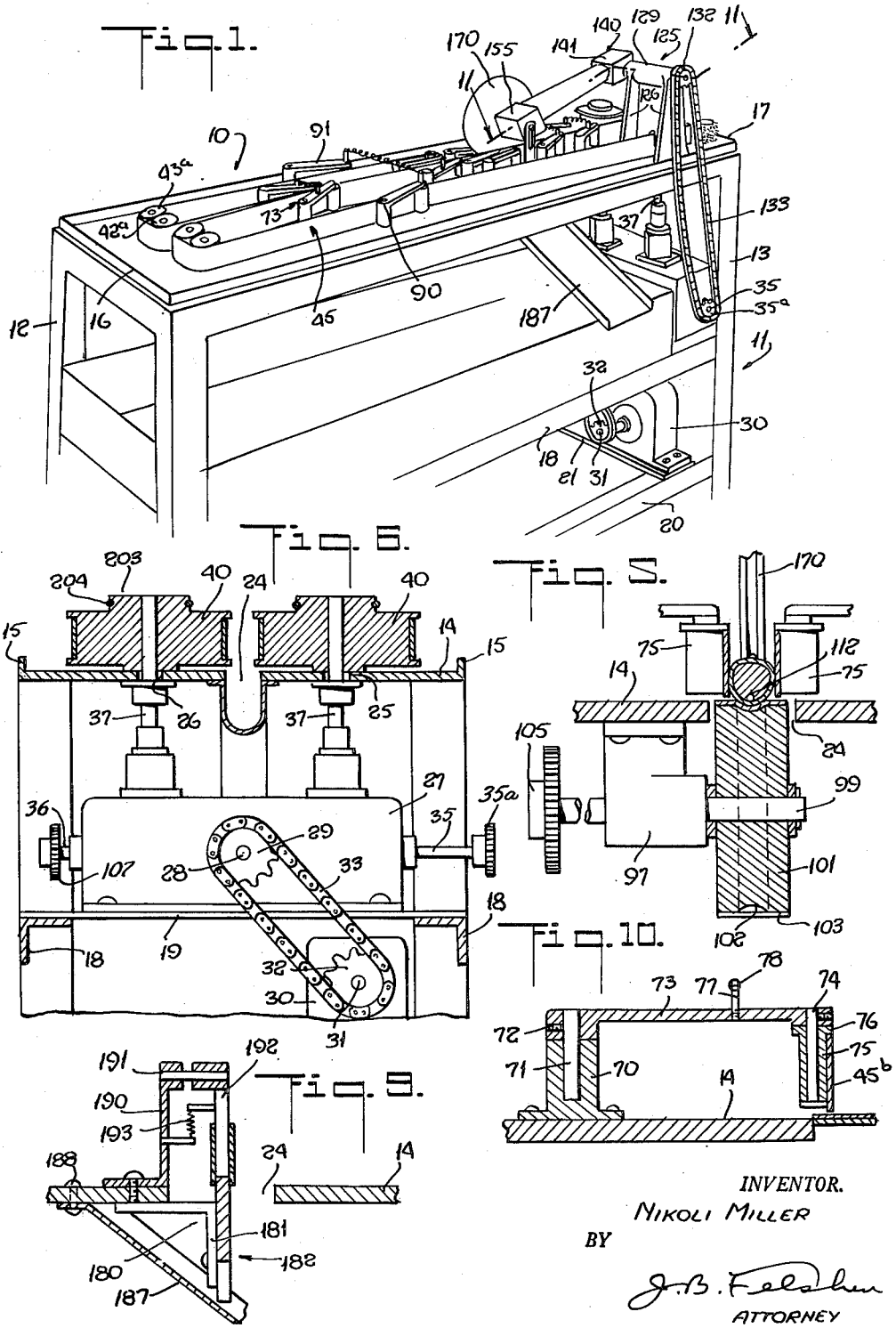

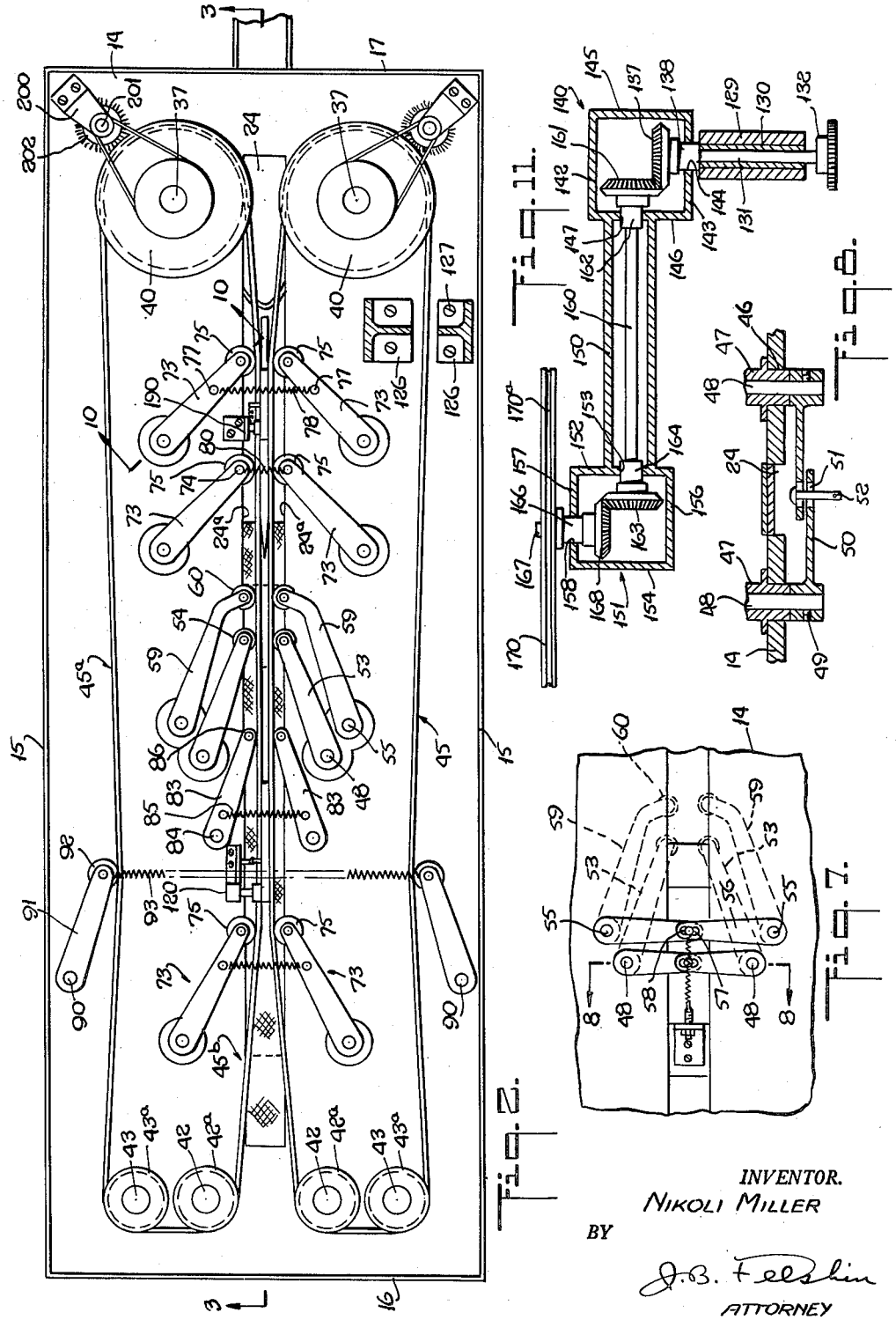

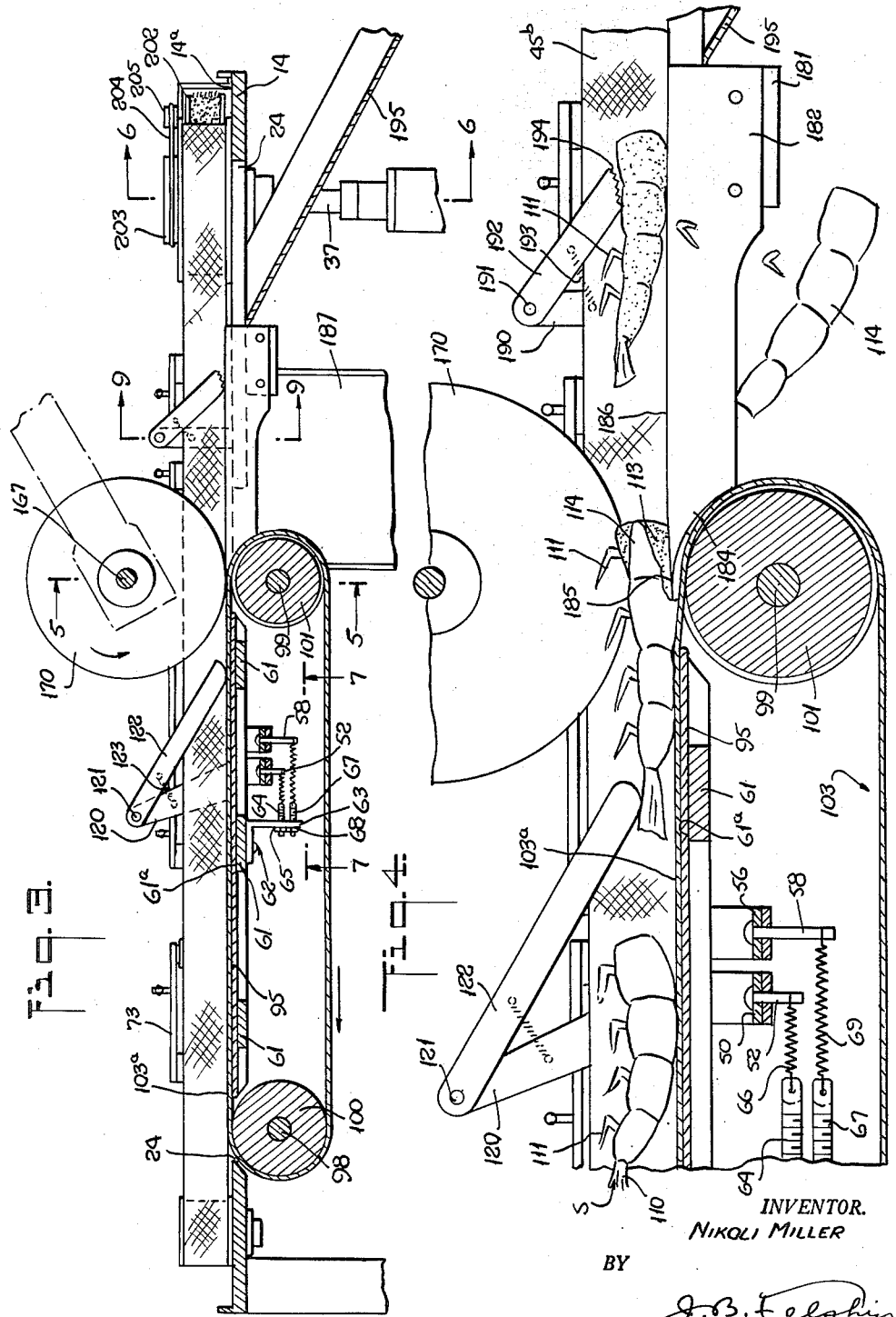

2,760,225

SHRIMP PEELING, DEVEINING AND MEAT SEPARATING MACHINE

Nikoli Miller, New York, N. Y.

Application April 2, 1953, Serial No. 346,449

10 Claims. (Cl. 17—2)

This invention relates to shrimp peeling, veining ana defeathering machines. This application is a continuation in part of my co-pending application Ser. No. 186,279 filed September 22, 1950, for Shrimp Peeling and Veining Machine, now Patent No. 2,637,064, issued May 5, 1953.

One object of my invention is generally to improve the machine shown in my said co-pending application Ser. No. 186,279 filed September 22, 1950, for Shrimp Peeling and Veining Machine issued May 5, 1953, as Patent No. 2,637,064.

A further object of this invention is to provide highly improved means for removing the legs which stick to the shrimp body after the shell is removed from the shrimp body.

Another object of this invention is to provide a highly improved means for deveining the shrimp including a belt running on a pair of rear and front horizontal wheels with a deveining or vein piercing tool having a curved edge substantially contacting the curved portion of the belt as it contacts the front wheel whereby to press the shell of the shrimp against said curved portion of the belt, and said wheel being formed with a central annular groove to permit the belt to be pressed into the groove as the shell is caught between the curved edge of the tool and the belt to facilitate removal of the shell from the body of the shrimp.

Still another object of this invention is to provide a machine of the character described, comprising a pair of symmetrically arranged belts mounted on top of a horizontal table, said belts being driven by wheels turning about vertical axes, with said belts having adjacent inner runs adapted to grip a shrimp therebetween to move it forwardly, highly improved means being provided to press said adjacent runs of the belt toward each other with substantially equal pressure and means being further provided to keep said belts taut.

Still a further object of this invention is to provide in a machine of the character described an arm rotatable about a horizontal axis and having its lower end projecting between the adjacent inner runs of said pair of belts to press the shrimp body downwardly against another belt having a horizontal top run disposed below the lower edges of said adjacent runs to guide said shrimp against the deveining and peeling tool.

Still a further object of this invention is to provide in a machine of the character described, highly improved means to brush the pair of belts clean during the operation of the machine.

Still a further object of this invention is to provide a strong, rugged and durable machine of the character described, which shall be relatively inexpensive to manufacture, smooth and positive in operation, and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the drawings forming a part of this specification and accompanying the same:

Fig. 1 is a perspective view of the machine embodying the invention;

Fig. 2 is a top plan view thereof with parts broken away and in cross section;

Fig. 3 is a cross sectional view taken on the line 3—3 of Fig. 2;

Fig. 4 is an enlarged view of a part of the structure shown in Fig. 3;

Fig. 5 is a cross sectional view taken on the line 5—5 of Fig. 3;

Fig. 6 is a cross sectional view taken on the line 6—6 of Fig. 3;

Fig. 7 is a bottom plan view taken on the plane 7—7 of Fig. 3;

Fig. 8 is a cross sectional view taken on the line 8—8 of Fig. 7;

Fig. 9 is a cross sectional view taken on the line 9—9 of Fig. 3;

Fig. 10 is a scross sectional view taken on the line 10—10 of Fig. 2;

Fig. 11 is a cross sectional view taken on the line 11—11 of Fig. 1.

Referring now in detail to the drawing, 10 designates a machine embodying the invention. The same comprises a stand 11 having rear legs 12 and front legs 13. Said legs support a top table or platform 14 provided with upstanding side flanges 15, a rear upstanding flange 16, and front upstanding flanges 17. Said front and rear legs are interconnected by a pair of horizontal side angle irons 18 supporting a transverse platform 19 disposed below the table top 14. Said legs also are interconnected by a pair of angle irons 20 supporting a platform 21 disposed below a platform 19.

The table 14 is formed with a central longitudinal slot 24 terminating short of the end flanges 16 and 17 of the table. Said table is furthermore formed with a pair of through openings 25, 26 symmetrically disposed with respect to the slot 24 and located adjacent the forward end of said slot.

Mounted on the platform 19 is a gear reduction box 27. Mounted on the gear reduction box 27 is an input shaft 28 carrying a sprocket gear 29. Mounted on the bottom platform 21 is an electric motor 30 provided with a shaft 31 carrying a sprocket gear 32. The sprocket gears 29 and 32 are interconnected by sprocket chain 33. Mounted within the gear reduction box 27 are a pair of horizontally aligned shafts 35 and 36, one extending to one side of the box and the other to the other side of the box. Extending upwardly from the gear box 27 are a pair of similar, symmetrical, vertical output shafts 37. Within the box 27 is any suitable reduction gearing for rotating the shafts. The vertical shafts 37 rotate in opposite directions, the lower shaft, looking at Fig. 2, rotating in a clockwise direction, and the upper shaft, looking at said figure in a counter-clockwise direction. The shaft 35 is rotated in a clockwise direction, looking at Fig. 1 of the drawing. The shaft 36 rotates in a direction opposite to the direction of rotation of the shaft 35. The shafts 37 rotate at the same speed.

The shafts 37 project upwardly through said openings 25 in the table or platform 14. Mounted on the portions of said shafts which project above the table are flanged pulleys or wheels 40. Said pulleys are similar and symmetrically disposed with respect to slot 24.

Mounted on the rear end of the table 14 on opposite sides of slot 24 and rearwardly thereof are symmetrically arranged pairs of shafts 42, 43 on which are mounted flanged pulleys 42a and 43a. The axes of the shafts 42, 43 are all in the same vertical plane. Surrounding each pulley 40 and the pulleys 42a and 43a on the same side of the slot 24, is a belt 45. The belts 45 are symmetrical relative to slot 24. Each belt 45 has an outer longitudinal run 45a and an inner longitudinal run 45b. The inner runs 45b are normally spaced from one another substantially by the width of the slot 24 and would run parallel except that they are pressed toward each other by means to be described hereinafter. The pulleys 42a and 43a are idlers, motion being imparted to the belts 45 by pulleys 40.

Means is provided to press the inner runs 45b of the belts 45 toward each other. To this end table 14 is formed on opposite sides of slot 24 (see Figs. 7 and 8) with pairs of through openings 46 in which are mounted bushings 47.

One pair of openings 46 is closer together than the other pair. Extending through the bushings in one pair of openings are vertical pins 48 projecting below said bushing. Fixed to the lower ends of the pins 48 as by set screws 49 are arms 50 extending toward each other and overlapping with one arm spaced above the other. The arms 50 are formed with registering slots 51 and extending through said slots is a cotter pin 52. Fixed to the upper ends of the pins 48 are arms 53 inclined forwardly and toward each other. Carried by the inner end of each arm 53 is a roller or follower 54 contacting the inner surface of the inner run 45b of one of the belts.

It will be noted that the bushings 47 and the arms 53 are located between the runs 45a and 45b of the belts.

Extending through the other pair of bushings 47 are pins 55, on the lower ends of which are fixed arms 56 provided with registering slots 57 through which extend a cotter pin 58. Fixed to the upper end of the pins 55 and disposed above the table are arms 59 inclined toward each other and carrying at their forward ends, rollers 60 likewise contacting the inner runs 45b of the belt 45. The cotter pin 58 extends to a point below the cotter pin 52.

Interconnecting the inner edges 24a of the slot 24 are a plurality of horizontal spaced transverse spacers 61 having top surfaces 61a disposed below the top surface 14a of the table.

Attached to the underside of one of the spacers 61 is a transverse angle iron 62 having a vertical downwardly extending wall or flange 63 formed with an opening through which extends a screw 64. A nut 65 on said screw contacts the back of wall 63. Screw 64 is connected by coil spring 66 to the pin 52. A second screw 67 extends through an opening in the vertical flange 63 of the angle iron 62 and carries a nut 68 contacting said flange. Screw 67 is connected by spring 69 to the pin 58. Thus pins 52 and 58 are drawn rearwardly tending to rotate the arms 53 toward each other and also the arms 59 toward each other. By turning the nuts 65 and 68 the tension on the springs 66 and 69 may be adjusted for adjusting the pressure of the rollers 54 and 60 against the inner runs 45b of the belts 45. Preferably, the pressure of these rollers should be similar.

The rollers 54 and 60 are located substantially at the middle of the inner runs 45b.

Attached to the top of table 14, and on opposite sides of the inner runs of the belt 45, are aligned pairs of bushings 70. Journalled in each bushing 70 is a pin 71 projecting above the bushing. Attached to the upper end of each pin 71, as by set screw 72, is an arm 73 inclined forwardly and inwardly. Attached to the inner end of each arm 73 and extending downwardly therefrom, is pin 74 formed with a head at its lower end. Mounted on each pin 74 is a roller 75 formed with a flange 76 at its upper end. The rollers 75 contact the inner runs 45b of the belts. The front pair of arms 73 each carry fixed upstanding pins 77. Each pair of pins 77 are interconnected by a coil tension spring 78 which press rollers 75 towards each other. The pins 74 of the more rearwardly pair of arms 73 are interconnected by coil tension spring 80 which also press a pair of rollers 75 toward each other.

It will be noted that the pairs of arms 73 are located between arms 53, 59 and the pulleys 40. One pair of rollers 75 is spaced from the other pair of rollers.

Another pair of arms 73 similarly mounted are located between the arms 53 and the rear pulleys 42a, 43a, and likewise carry rollers 75 to press the inner runs 45a of the belts toward each other. Between the rear arms 73 and the arms 53 are located another pair of pivoted arms 83 pivoted about fixed pins 84 and drawn toward each other by coil tension spring 85. The forward ends of the arms carry rollers 86 to press the inner runs of the belts 45 toward each other.

Means is provided to take up slack in the belts 45 and to keep them taut. To this end there is fixed to the table top 14, and near the side flanges 15, pins 90 located between the outer runs 45a of the belts 45 and said flanges 15 and closer to the rear pulleys 42a and 43a than to the front pulleys 40. Pivoted to the pins 90 and extending forwardly therefrom are arms 91 carrying rollers 92 contacting the outer runs of the belt. The forward ends of said arms are drawn to each other by coil tension spring 93 interconnecting said arms.

Supported on the transverse spacer strips 61 is a horizontal flat bar 95, the top surface of which is flush with the top surface 14a of the table 14. The rear end of the bar 95 is spaced from the rear end of the slot 24. The forward end of the bar 95 is spaced from the forward end of the slot 24 by a greater distance. Attached to the underside of the table 14 adjacent the slot 24, are a pair of bearings 97 (one only of these bearings being shown), supporting a pair of transverse horizontal, parallel shafts 98, 99 crossing beneath the slot 24. The rear shaft 98 is located at the rear end of the slot 24. The front shaft 99 is located forwardly of the forward end of bar 95.

Mounted on shaft 98 is a wheel or pulley 100. Mounted on shaft 99 is wheel or pulley 101. The pulley 101 is formed with an annular central groove 102. The pulleys 100 and 101 project upwardly into the slot 24. The tops of the pulleys are substantially flush with the top surface of table 14. Received on said pulleys is a belt 103. Spacer strips 61 are located between the pulleys 100, 101. The bar 95 is also located between said pulleys. The top run 103a of the belt 100 rests on the bar 95 and is located below the lower edges of the inner runs 45b of the belts 45.

The lower edges of said belts 45 are spaced above the table top and substantially at the level of the upper surface of the upper run 103a of the belt 103.

On the shaft 99 is a sprocket wheel 105 connected by sprocket chain 106 to a sprocket wheel 107 mounted on shaft 36. Sprocket chain 106 is inclined upwardly and rearwardly. With such construction the motor 30 will drive the belt 103. Looking at Fig. 3, pulley 101 rotates in a clockwise direction so that the upper run 103a of the belt 103 moves forwardly or in the same direction as the inner runs 45b of the belt 45.

It will now be understood that shrimps S may be fed between the inner runs 45b of the belts 45 from the rear end. These shrimp are moved on their backs forwardly over the table until they are gripped by the belts 45. It will be noted that the pulleys 42a are spaced apart and that the portions of the inner runs of the belts passing from said pulleys are inclined inwardly toward each other as shown in Fig. 2 of the drawing, to facilitate insertion of the shrimp. The shrimps are decapitated before insertion into the machine. The tails 110 are to the rear and the legs 111 are at the top. The shrimps S rest on run 103a of belt 103. The sand vein 112 in the body 113 of the shrimp is at the bottom. The shell 114 surrounds the body.

It is the purpose of this machine to clean out the sand vein 112, remove and clean the shell 114 from the body 113, and also to remove the legs 111 from the body 113. All the operator has to do is to insert the shrimp, one after the other, between the inner runs of the belt, and as the shrimp is moved forwardly, the deveining operation as well as the removal of the shell 114 and the legs 111 is carried out automatically by means to be described hereinafter.

Means is provided to hold the shrimps down against the top run 103a of the belt 103. To this end there is fixed to the table top 14 and at one side of one of the inner runs 45b, an upwardly and rearwardly inclined arm or bracket 120, carrying a horizontal pin 121 at its upper end. Pivoted to the pin 121 and inclined downwardly and forwardly is an arm 122 received between the inner runs 45b of the belts 45. Arm 122 is interconnected to arm 120 by coil tension spring 123 (see Figs. 3 and 4). The lower end of the arm 122 contacts the top of the shrimp as the shrimp passes lengthwise and presses it down against the upper run 103a of the belt 103. It will be noted that the arm 122 is located rearwardly of the front wheel 101.

Means is provided to press the shrimp down against the portion of the upper run of the belt which begins to contact the front wheel 101. To this end there is fixed to the table top 14 just rearwardly of one of the pulleys 40, a bearing member 125. The bearing 125 comprises the pair of legs 126 straddling the outer run 45a of the belt 45 located at the side of the machine corresponding to the side where the shaft 35 is located. These legs 126 are attached to the table top by screws 127. The legs 126 carry a horizontal transverse sleeve 129 in which is located a bushing 130. Passing through the bushing 130 is a shaft 131 carrying at one end sprocket wheel 132. The sprocket wheel 132 is connected by sprocket chain 133 to a sprocket wheel 35a on shaft 35. Thus shaft 131 is rotated by motor power derived from the motor 30.

Fixed to the opposite end of shaft 131 is a bevel gear 137. On shaft 131 is bushing 138 in which said shaft is journalled. Mounted on bushing 138 is box 140. The box 140 has top and bottom walls 141 and outer wall 142 and inner wall 143 formed with opening 144 in which the bushing 138 is mounted. Said box also has an end wall 145 and an opposite wall 146 formed with opening 147. Fixed to wall 146 is a sleeve 150. Fixed to the opposite end of the sleeve 150 is another box 151. The box 151 has a wall 152 formed with an opening 153 aligned with the opening 147. Box 151 has a wall 154 opposite wall 152. It is formed with top and bottom walls 155. It also has an inner wall 156 and outer wall 157. Wall 157 is formed with an opening 158. Extending through sleeve 150 is a shaft 160. Fixed to one end of the shaft is a bevel gear 161 meshing with the bevel gear 137 and located within box 140. On said shaft 160 is a bushing 162 mounted within opening 147. Fixed to the opposite end of the shaft 160 is bevel gear 163 located within the box 151. On said shaft 160 is bushing 164 mounted within the opening 153.

Within opening 158 is mounted a bushing 166. Journalled within bushing 166 is a shaft 167. Fixed to one end of the shaft is a bevel gear 168 located within box 151 and meshing with bevel gear 163. Mounted on one end of shaft 167 is a disc 170 the lower portion of which is received between the inner runs 45a of the belt 45. The axis of shaft 167 is located substantially directly above the axis of shaft 99.

It will now be noted that when the motor operates, disc 170 will rotate in a clockwise direction, looking at Figs. 3 and 4 of the drawing. Said disc 170 may be formed with a central peripheral groove 170a. As the disc 170 rotates, it will press the shrimp down against the top of the belt as the belt begins to contact the wheel 101.

Means is provided to devein the shrimp and at the same time to separate the shell 114, from the body of the shrimp. To this end there is fixed to the underside of table 14 (see Fig. 9) an angle bracket 180, having a downwardly extending flange 181 located to one side of a vertical plane bisecting slot 24 longitudinally. This bracket 180 is located between the wheel 101 and the pulleys 40. Attached to flange 181 is a piercing or deveining tool 182 disposed in a vertical plane. The tool 182 has a rear curved under edge 184 substantially contacting the curved surface of the portion of belt 103 which contacts the upper portion of wheel 101. Said tool has a rearwardly extending point 185 located substantially directly above the axis of the shaft 99, said point constituting the rear end of the curved edge 184. Said tool 182 has a top edge 186 located slightly above the supper surface of the upper run 103a of the belt 103, said upper edge extending forwardly of the point 185. The curved edge 184 may be substantially 90° in extent.

As the shrimp is moved forwardly between the inner runs 45a of the belts 45, and is pressed down first by arm 122 and then by rotating disc 170, the forward end 185 of the tool 182 will enter the vein 112 of the shrimp and said tool will also engage the inside of the bottom portion of the shell 114. The body of shrimp will contact the top edge 186 of the tool and will be moved forwardly, but the shell being weaker at the top, will break or sever at that place and the shell will be drawn downwardly between the edge 184 and the belt 103. Thus the shell 114 will be separated from the body of the shrimp and at the same time the sand vein of the shrimp will be cleaned out and removed.

It will be noted that the curved edge 184 is aligned with the annular groove 102 in the wheel 101 so that the belt may be pushed into the groove at the place where the shell is wedged or moves between the edge 184 and the belt. The groove 102 therefore permits the belt to be pressed inwardly so as to facilitate passage of the shell between the curved edge 184 and said belt. The shells will slide down an inclined transverse chute or guide 187 attached at its upper end to the underside of the table 114 as by screws 188. Any suitable receptacle may be positioned to receive the shells which drop down the chute or guide 187.

It will be noted that the legs 111 stick to the body as the body of the shrimp slides along the top of tool 182 and between the inner run 45b of the belts. Means is provided to remove these legs from the body of the shrimp. To this end there is fixed to the table top 14, an upstanding bracket 190 carrying a pin 191 at its upper end. Pivoted to said pin is an arm 192 projecting down between the inner runs 45b of the belts 45. The arm 192 is resiliently pressed downwardly by a coil tension spring 193 which interconnects the swinging arm 192 with the bracket 190. The arm 192 is inclined downwardly and forwardly. Its lower edge is serrated as at 194 and this serrated edge serves to sever or tear the legs 111 off the body of the shrimp. As the shrimp is moved forwardly, it is carried to point above another chute 195 which is attached to the underside of the belt and is inclined downwardly and forwardly. When the shrimp reaches the point where the inner runs of the belt begin to separate as they approach the pulleys 40, the body of the shrimp is released and drops down through slot 24 on to the chute so that it can be guided to any suitable receptacle. The shrimps move down through the forward end of the slot 24 to the chute 195.

Any suitable water supply system (not shown) may be provided for washing the shrimp as it passes through the machine.

Means is provided to clean the belts 45. To this end there is mounted on the table 14 at the two front corners thereof Z-shaped brackets 200, supporting vertical pins 201 on each of which is rotatably mounted a brush 202. The brushes 202 contact portions of the belts which contact the pulleys 40. Each pulley 40 is formed at its upper end with an additional reduced pulley 203 belted as by belt 204 to a pulley 205 fixed to rotate with the brush 202. Thus the brushes 202 will rotate while the machine operates, to clean the portion of the belt which eventually grips the shrimp.

I claim as new and desire to secure by Letters Patent of the United States:

1. A shrimp peeling and deveining machine comprising a table; a horizontal travelling endless conveyor disposed on said table, the upper run of which conveyor is located substantially in the plane of the top of the table; resilient lateral guide means located above the upper run of said conveyor; means on the table for driving said conveyor so that a shrimp fed between said guide means will be moved forwardly on the upper run of said conveyor; a forwardly disposed wheel, over which said conveyor is trained, said wheel being formed with a central peripheral groove between two peripheral cylindrical portions of substantial width, said endless conveyor contacting said cylindrical portions of the forward wheel on opposite sides of the groove and being normally spaced from the bottom of said groove whereby to provide a yielding support for the shrimp as it passes over said wheel; and a deveining tool having a rearwardly extending point, located above the axis of said forward wheel, adapted to enter the sand vein of a shrimp fed forwardly.

2. A shrimp peeling and deveining machine as defined in claim 1, wherein said deveining tool is formed with a depending curved edge adjacent a portion of the conveyor contacting the forward wheel, whereby said portion of the conveyor may be depressed into the groove by the shell of the shrimp as the latter is moved between said conveyor and said curved edge.

3. A shrimp peeling and deveining machine as defined in claim 1, wherein the shell and sand vein are removed from the shrimp as the latter is moved on its back toward said tool, and means on said table for removing the legs from the shrimp as the latter continues to be moved after the shell and vein are removed from the body of said shrimp.

4. A shrimp peeling and deveining machine as defined in claim 1, wherein an arm is mounted for pivotal movement about a horizontal axis above said conveyor, said arm being inclined downwardly and forwardly between the guide means and disposed forwardly of the front end of said conveyor, said arm having a serrated lower edge, and resilient means to urge said arm to swing downwardly about its pivotal axis.

5. A shrimp peeling and deveining machine as defined in claim 1, wherein a rotary disk is mounted to rotate on a horizontal axis disposed substantially directly above and parallel with the axis of rotation of said forward wheel, said disc mounting being moveable so as to afford freedom of vertical movement to said disc, so that the lower edge thereof may project between said guide means substantially directly over the piercing end of said tool.

6. A shrimp peeling and deveining machine as defined in claim 5, wherein said disc is formed with a peripheral groove between two annular shoulders at the peripheral edges of the disc, whereby better contact with the shrimp may be obtained to press the latter against the surface of the conveyor.

7. A shrimp meat separating machine as defined in claim 1, wherein means is provided for guiding the shell removed from the shrimp body to a separate point of discharge, and means is provided to guide the meat to another point of discharge after the legs are removed.

8. A shrimp peeling and deveining machine comprising a table; a pair of wheels below said table, rotatable on horizontal axes, a belt interconnecting said wheels, the upper run of the belt being located substantially in the plane of the top of the table; a pair of belts mounted on vertical pulleys on the table with the inner runs of the belts located above the upper run of the first belt, means to drive the said belts so that a shrimp fed between the inner runs of said pair of belts will be moved forwardly and said upper run of said first belt will move in the same direction, the forward wheel of the pair of wheels carrying said first belt being formed with a central peripheral groove between two peripheral cylindrical portions of substantial width, said first mentioned belt contacting said cylindrical portions of the forward wheel on opposite sides of the groove and being normally spaced from the bottom of said groove whereby to provide a yielding support for the shrimp as it passes over said wheel; and a deveining tool having a rearwardly extending point, located above the axis of said forward wheel, adapted to enter the sand vein of a shrimp fed forwardly.

9. A shrimp peeling and deveining machine as defined in claim 8, wherein said deveining tool is formed with a depending curved edge adjacent a portion of the first mentioned belt contacting the forward wheel, whereby said portion of the belt may be depressed into the groove by said shell, as the latter is moved between said belt and said curved edge.

10. A shrimp peeling and deveining machine as defined in claim 8; wherein a rotary disk is mounted to rotate on a horizontal axis disposed substantially directly above and parallel with the axis of rotation of said forward wheel, said disc mounting being movable so as afford freedom of vertical movement to said disc, so that the lower edge thereof may project between the inner runs of the pair of belts substantially directly over the piercing end of said tool.

References Cited in the file of this patent
UNITED STATES PATENTS

| | | |
|---|---|---|
| 2,263,696 | Grayson | Nov. 25, 1941 |
| 2,263,697 | Grayson | Nov. 25, 1941 |
| 2,325,680 | Hunt | Aug. 3, 1943 |
| 2,344,711 | McNutt et al. | Mar. 21, 1944 |
| 2,637,064 | Miller | May 5, 1953 |